(12) United States Patent
Suzuki

(10) Patent No.: US 6,932,589 B2
(45) Date of Patent: Aug. 23, 2005

(54) MOLD FOR A PNEUMATIC TIRE

(75) Inventor: Kazuya Suzuki, Kobe (JP)

(73) Assignee: Sumitomo Rubber Industries, Ltd., Hyogo-ken (JP)

( * ) Notice: Subject to any disclaimer, the term of this patent is extended or adjusted under 35 U.S.C. 154(b) by 112 days.

(21) Appl. No.: 10/328,015

(22) Filed: Dec. 26, 2002

(65) Prior Publication Data

US 2003/0140997 A1 Jul. 31, 2003

(30) Foreign Application Priority Data

Dec. 26, 2001 (JP) ........................................ 2001-394749

(51) Int. Cl.$^7$ ............................................ B29C 35/02
(52) U.S. Cl. ........................... 425/28.1; 425/35; 425/46
(58) Field of Search ............................. 425/28.1, 35, 46

(56) References Cited

U.S. PATENT DOCUMENTS

| | | | | |
|---|---|---|---|---|
| 4,411,175 A | * | 10/1983 | Takahashi et al. | 76/107.1 |
| 5,120,209 A | * | 6/1992 | MacMillan | 425/46 |
| 5,769,990 A | * | 6/1998 | Hoffmeister | 425/46 |
| 6,220,844 B1 | * | 4/2001 | Kusano | 425/46 |

FOREIGN PATENT DOCUMENTS

| | | |
|---|---|---|
| EP | 0 451 832 A2 | 10/1991 |
| EP | 1 016 556 A2 | 7/2000 |
| EP | 1 106 396 A2 | 6/2001 |

OTHER PUBLICATIONS

Patent Abstracts of Japan, vol. 1996, No. 12, Dec. 26, 1996, JP 8–216154.
Patent Abstracts of Japan, vol. 0100, No. 37, Feb. 14, 1986, JP 60–189611.
Patent Abstracts of Japan, vol. 2000, No. 05, Sep. 14, 2000, JP 2000–043522.

* cited by examiner

Primary Examiner—James P. Mackey
(74) Attorney, Agent, or Firm—Birch, Stewart Kolasch & Birch, LLP

(57) ABSTRACT

A mold for a pneumatic tire which contains a pair of bead portions, a pair of sidewall portions and a tread portion provided with a tread pattern formed by repeating a pattern unit around the tire at plural kinds of pitches in a sequence, wherein the mold includes a sidewall molding surface for one of the sidewall portions, and a tread molding surface provided with a negative tread pattern formed by repeating the negative pattern unit at the above-mentioned plural kinds of pitches in order to mold the tread pattern. The sidewall molding surface contains sector regions defined as extending radially inwardly from the pattern units, respectively, wherein the largest sector regions are defined as extending from the pattern units with the largest pitch swells towards a cavity of the mold, when compared with the smallest sector regions which are defined as extending from the pattern units with the smallest pitch. The amount of swelling is such that the larger the pitch, the larger the amount of swelling.

5 Claims, 7 Drawing Sheets

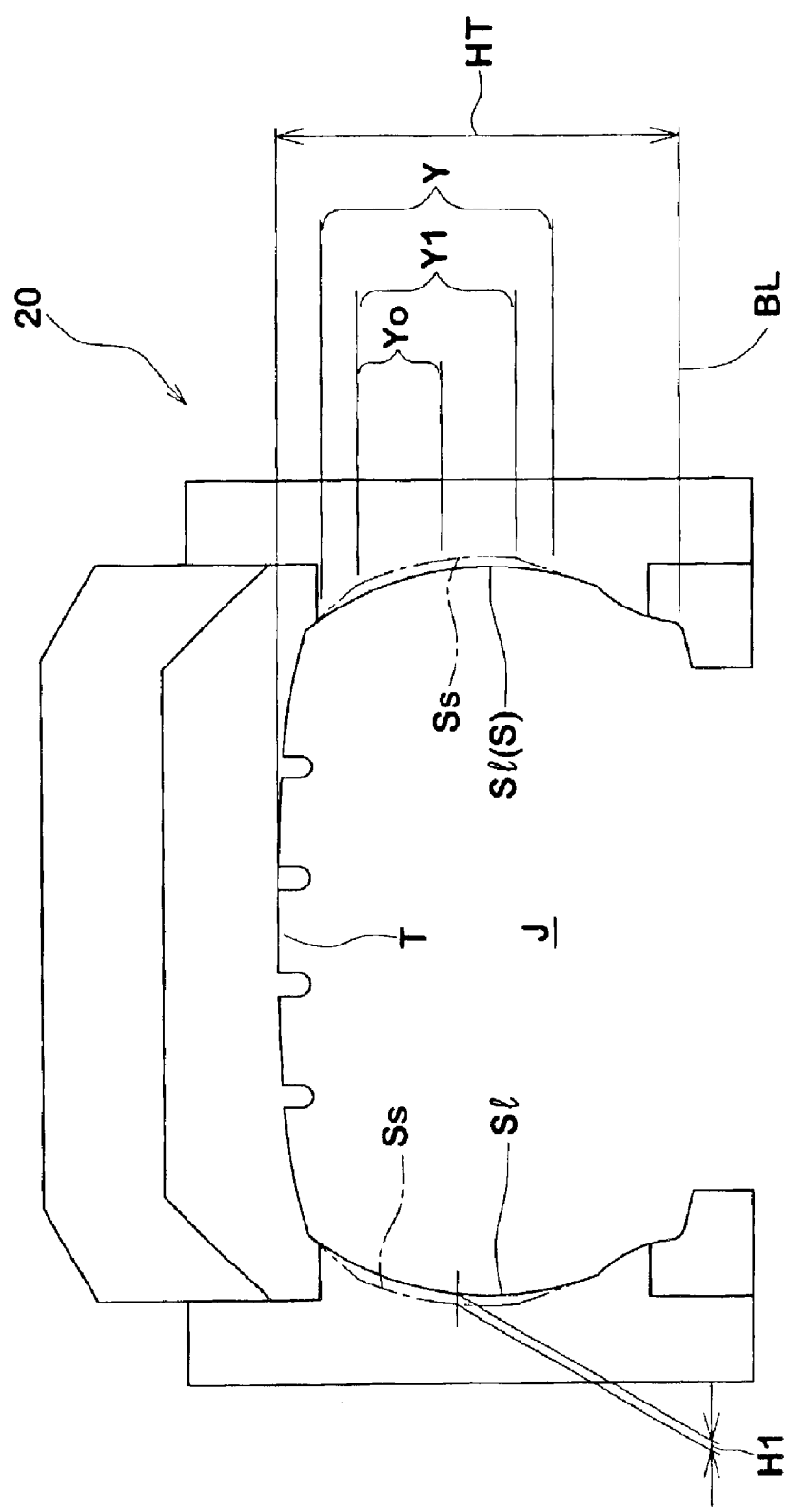

MOLD FOR A PNEUMATIC TIRE

The present invention relates to a mold for a pneumatic tire having a variable-pitch tread and more particularly to a sidewall molding surface associated with the variable-pitch tread pattern for improving tire uniformity.

In general, a pneumatic tire such as passenger car tires and RV tires are provided, in the tread portion, with a tread pattern which is formed by repeating a pattern unit in the tire circumferential direction at variable pitches, in an elaborate sequence, to reduce noise.

In such a tire, however, due to the pitch variation, tire uniformity is likely to deteriorate and as well known in the art, radial force variation, radial run out and the like are increased.

In recent years, as a result of diligent studies on tread patterns, such variations have had the inclination to disappear or be minimized, but in turn, a problem of tractive force variation (TFV) has developed.

SUMMARY OF THE INVENTION

It is therefore, a primary object of the present invention to provide a pneumatic tire in which tire uniformity especially the tractive force variation thereof is improved.

Another object of the present invention is to provide a mold for such a pneumatic tire According to one aspect of the present invention, a mold, which is used for a pneumatic tire containing a pair of bead portions, a pair of sidewall portions and a tread portion provided with a tread pattern formed by repeating a pattern unit around the tire with a plurality of kinds of pitches in a sequence, is provided which includes a sidewall molding surface for one of the sidewall portions, and a tread molding surface provided with a negative tread pattern formed by repeating the negative pattern unit with said plurality of kinds of pitches, in said sequence, to mold said tread pattern, the sidewall molding surface containing sector regions defined as extending radially inwardly from the respective pattern units, wherein the largest sector regions, defined as extending from the pattern units with the largest pitch, swells towards a cavity of the mold when compared with the smallest sector regions, defined as extending from the pattern units with the smallest pitch.

BRIEF DESCRIPTION OF THE DRAWINGS

Embodiments of the present invention will now be described in detail in conjunction with the accompanying drawings.

FIG. 4 is a schematic cross sectional view of a vulcanizing mold according to the present invention.

DETAILED DESCRIPTION OF THE INVENTION

Figure 1:
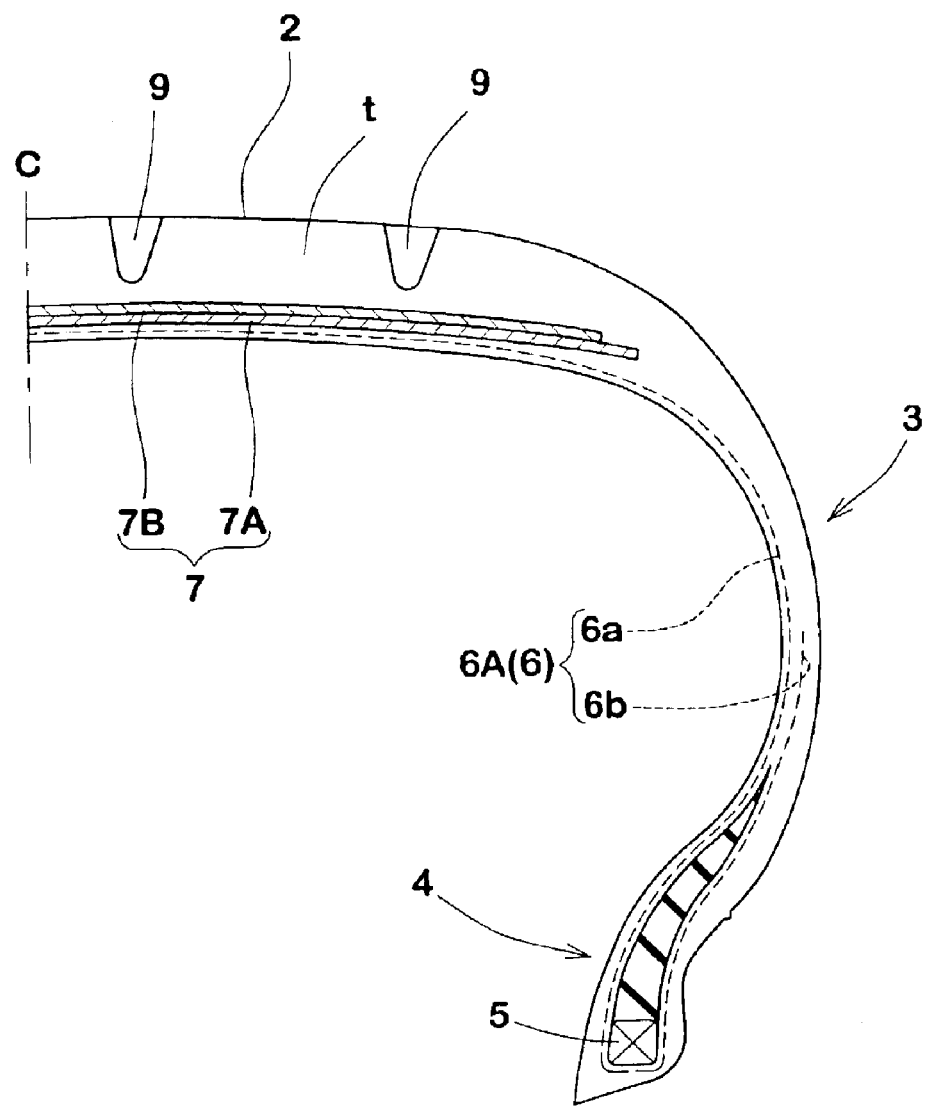
FIG. 1 is a cross sectional view showing an example of the pneumatic tire which can be made by using a mold according to the present invention.

In the drawings, the pneumatic tire 1 according to the present invention contains a tread portion 2, a pair of axially spaced bead portions 4, each with a bead core 5 therein, a pair of sidewall portions 3, a carcass 6 extending between the bead portions 4, and reinforcing cord layers including at least a tread belt 7 disposed radially outside the carcass 6 in the tread portion 2.

The carcass 6 contains at least one ply, in this example only one ply 6A of cords arranged radially at an angle of from 70 to 90 degrees with respect to the tire equator and extending between the bead portions and being turned up around the bead cores 5 so as to form a pair of turned up portions 6b and a main portion 6a therebetween.

The belt 7 comprises at least two cross plies 7A and 7B of substantially parallel cords laid at an angle of from 10 to 35 degrees with respect to the tire equator.

The tread portion 2 is provided with tread grooves 9 to form a tread pattern such as block type pattern (blocks only) and rib-block type pattern (rib and blocks). The tread pattern may include a row of blocks 11 divided by circumferential grooves and axial grooves, a circumferentially continuous rib 10 or the like. For example, in FIG. 2, the tread portion 2 is divided into a central rib 10 on the tire equator C, and two circumferential rows 11R of blocks 11 on each side of the rib 10.

The tread pattern is formed by repeating a pattern unit E around the circumference of the tire at variable pitch lengths P. It may be said that the larger the pattern unit, the larger the total volume of the tread element such as block and rib.

Figure 3:
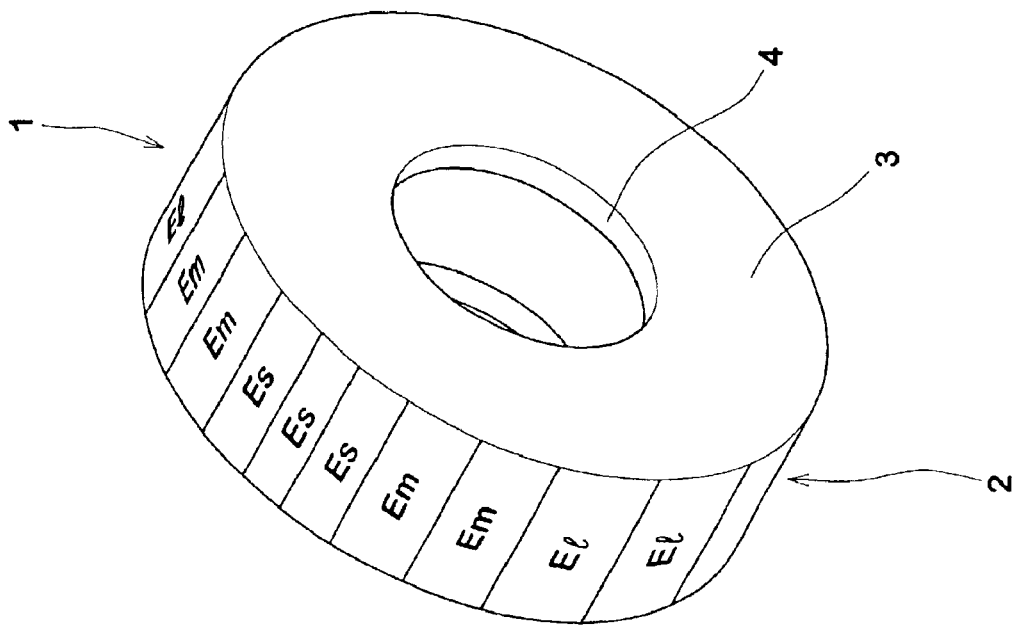
FIG. 3 is a schematic perspective view of a tire for explaining an example of a three-pitch arrangement.

In the embodiment shown in the drawings, the number of kinds of the different pitch lengths P is three, namely, a maximum pitch length Pl, a minimum pitch length Ps and a middle pitch length Pm. Thus, the largest pattern unit El having the maximum pitch length Pl, the middle-size pattern unit Em having the middle pitch length Pm, and the smallest pattern unit Es having the minimum pitch length Ps are arranged in a specific sequence so that the largest pattern unit El does not come next to the smallest pattern unit Es in order to prevent uneven wear. FIG.3 shows an example of such a sequence.

Based on the sequence, a tire vulcanizing mold 20 is designed to improve the TFV.

Figure 8:
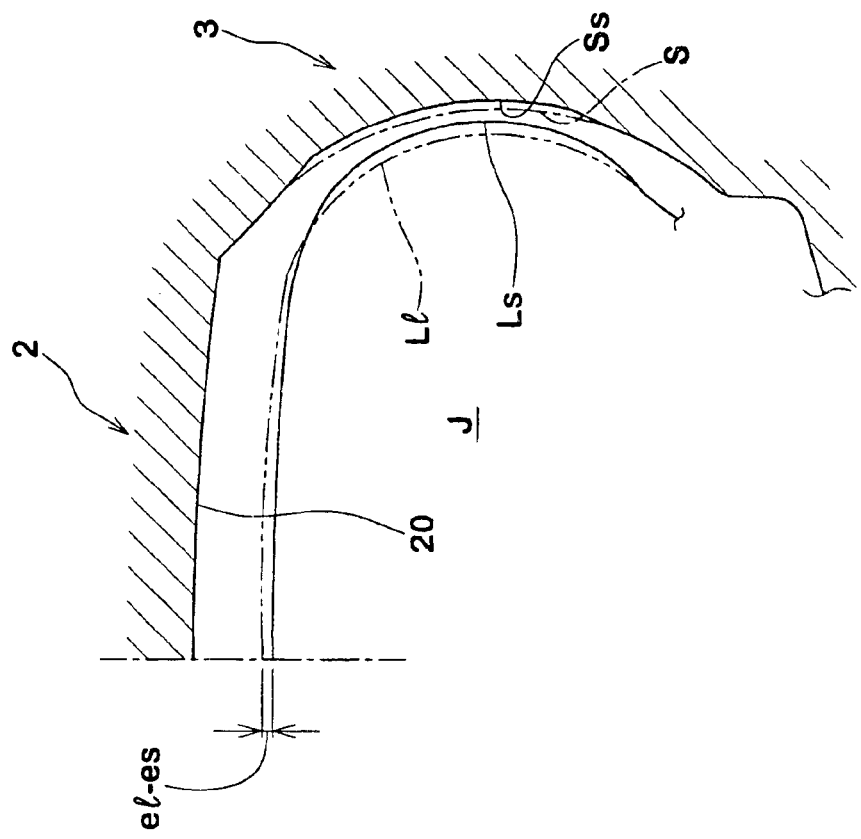
FIG. 8 is a cross sectional view of the mold and raw tire for explaining the effect of the swelling part.

According to the present invention, the vulcanizing mold 20 has a surface T for molding the tread portion 2 (hereinafter, the tread molding surface T) and a surface S for molding the sidewall portion 3 (hereinafter, the sidewall molding surface 5) as shown in FIGS. 4 and 8.

Figure 5:
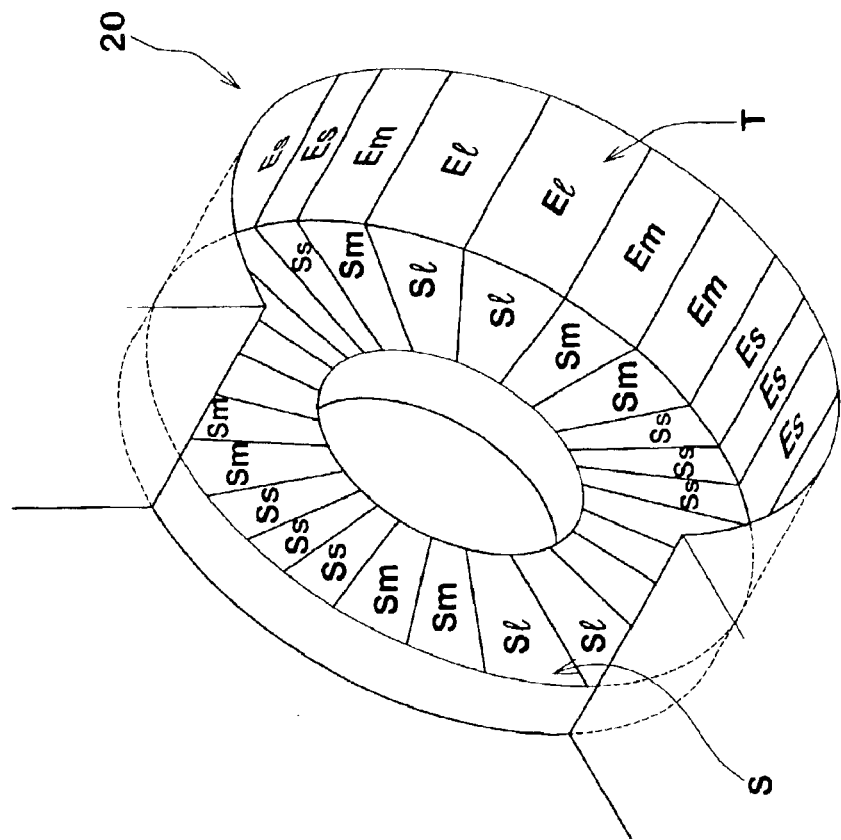
FIG. 5 is a partial schematic perspective view showing the tread molding surface and sidewall molding surface of the mold corresponding to FIG. 3.

The tread molding surface T is provided with a negative pattern of the above-mentioned tread pattern, namely, protrusions corresponding to the tread grooves and dents (b)

corresponding to the tread elements, such as block and rib. As shown in FIG. 5, based on the arrangement of pattern units E, the sidewall molding surface S is imaginary divided into sector regions S having corresponding pitch variations (pitch angle variation). Accordingly, the sector regions S in this example include: a largest sector region Sl corresponding to the largest pattern unit El and extending radially inwards from the axial edge thereof; a middle sector region Sm corresponding to the middle-size pattern unit Em and extending radially inwards from the edge thereof; and a smallest sector region Ss corresponding to the smallest pattern unit Es and extending radially inwards from the edge thereof.

As shown in FIG. 4, the largest sector region Sl (in solid lines) swells towards the mold cavity J when compared with the smallest sector region Ss (in imaginary lines).

The amount H1 of maximum swelling is set in a range of from 0.1 to 1.0 mm, preferably 0.1 to 0.5 mm in the tire axial direction. It is necessary that the swelling region Y is designed to include at least a region Y0 ranging from 0.6 time to 0.8 times the section height HT of the mold cavity J which corresponds to the tire sectional height from the bead base line BL.

In view of the external view and performance of the tire, it is preferable that the swelling region Y is at most such a region Y1 that ranges from 0.4 time to 0.8 times the section height HT.

However, it may be possible to swell almost the entirety of the largest sector region Sl.

If the above-mentioned amount H1 of maximum swelling is less than 0.1 mm, it becomes difficult to reduce TFV. If more than 1.0 mm, the appearance of the tire becomes worse.

Figure 6:
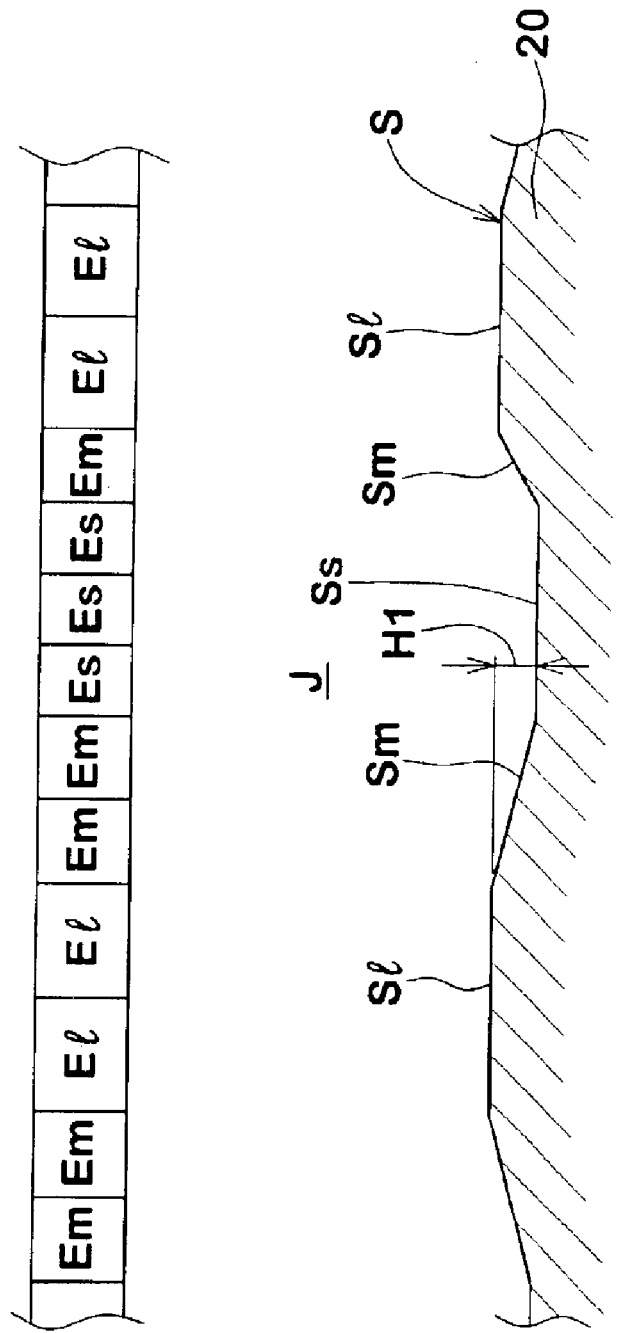
FIG. 6 is a schematic cross sectional view of the sidewall molding surface.

As to other sector regions S than the largest sector region Sl and smallest sector region Ss, the degree of swelling is somewhere inbetween in proportion to the pitch length P. In this example, the middle sector region Sm corresponds thereto, and it is, as shown in FIG. 6, formed as a slant face smoothly connecting the largest sector region Sl and the smallest sector region Ss, while bridging the step or surface level difference therebetween.

Figure 7:
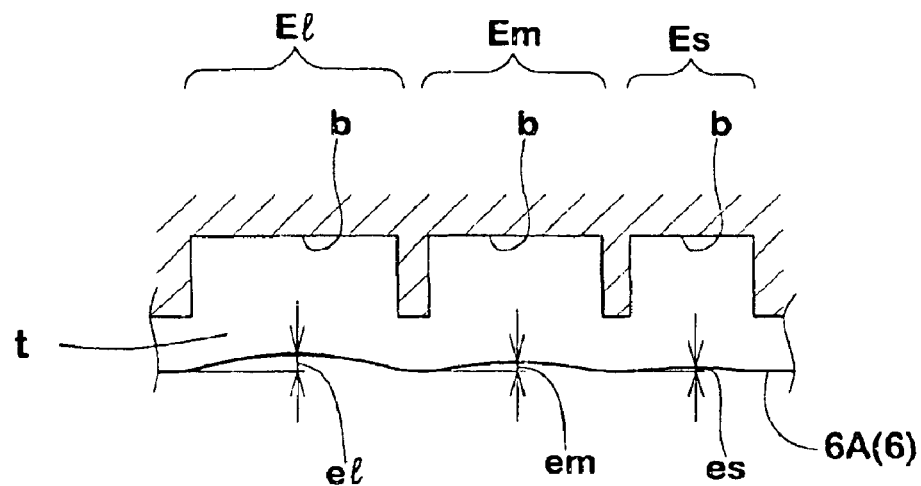
FIG. 7 is a schematic enlarged cross sectional view showing the carcass undulation in the tread portion due to the variable pitches.

During the vulcanizing of the raw tire in the mold, the inside of the raw tire is pressurized by using an inflatable tube or bladder, and the tread rubber is pressed onto the tread molding surface T. The tread rubber enters into the dents (b). As a result, as shown in FIG. 7 with exaggeration, the carcass ply 6A is slightly moved towards the dents (b) and small undulations (el, em, es) are created in the carcass 6. As the pitch length P becomes longer, the volume of the dent becomes larger, and as a result, the movement becomes larger. The carcass undulations el, em and es in the pattern units El, Em and Es, respectively, becomes el>em>es.

Figure 10:
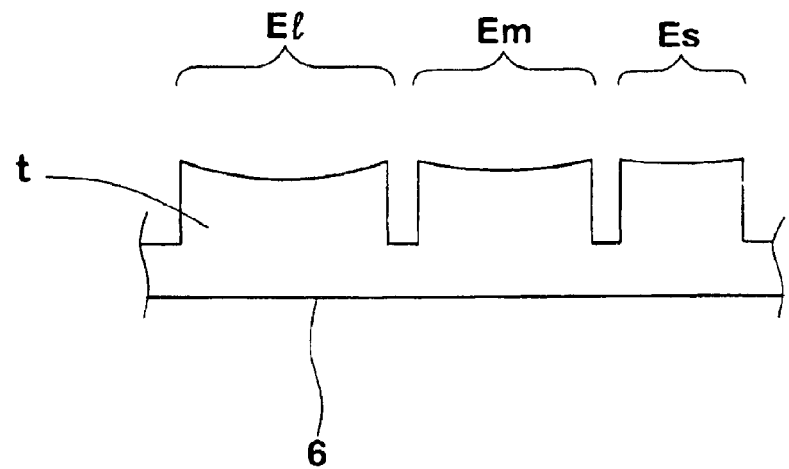
FIG. 10 is a schematic cross sectional view of the tread portion of the inflated tire which is molded with the conventional mold.
Figure 9:
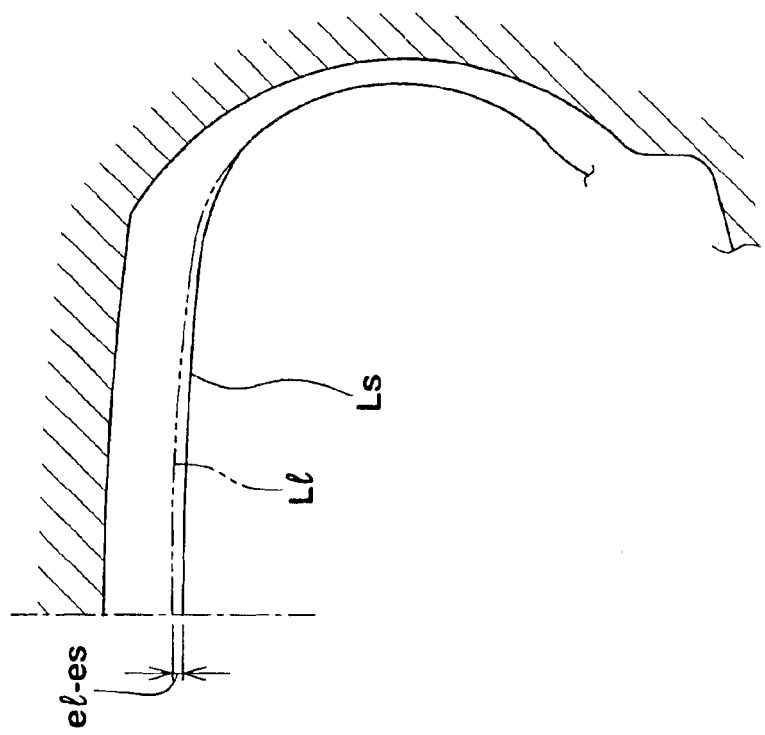
FIG. 9 is a cross sectional view of a conventional mold not provided with the swelling part.

In the case of the conventional mold, accordingly, the carcass cord tension tl, tm and ts therein are varied in proportion to the undulation, namely, tl>tm>ts. As shown in FIG. 9 with exaggeration, the difference of the carcass cord path Ll between the bead cores at the pattern unit El from the carcass cord path Ls that at the pattern unit Es becomes about 0.5 to about 2.0 mm. Therefore, as the finished tire is inflated in use, the tension of the carcass cords increases, and the elongation of the carcass cords becomes larger at the pattern unit E having the smaller pitch because the tension in the mold is smaller. As a results, as shown in FIG. 10 with exaggeration, the level of the tread face becomes uneven and the TFV increases.

In case of the present invention, on the other hand, as shown in FIG. 8 with exaggeration, in the swelling region Y, the carcass line Ll of the large pattern unit El falls inside of the carcass line Ls of the small pattern unit Es due to the swelling. Thus, in the sidewall portion 3, the carcass cord path of the large pattern unit El becomes shorter than that of the smaller pattern unit Es. Accordingly, the difference in the cord path in the tread portion 2 is compensated for by the difference in the sidewall portion 3, and the carcass cord tension becomes uniform during the vulcanizing of the tire in the mold. As a result, the TFV is improved.

Comparison Test

Figure 2:
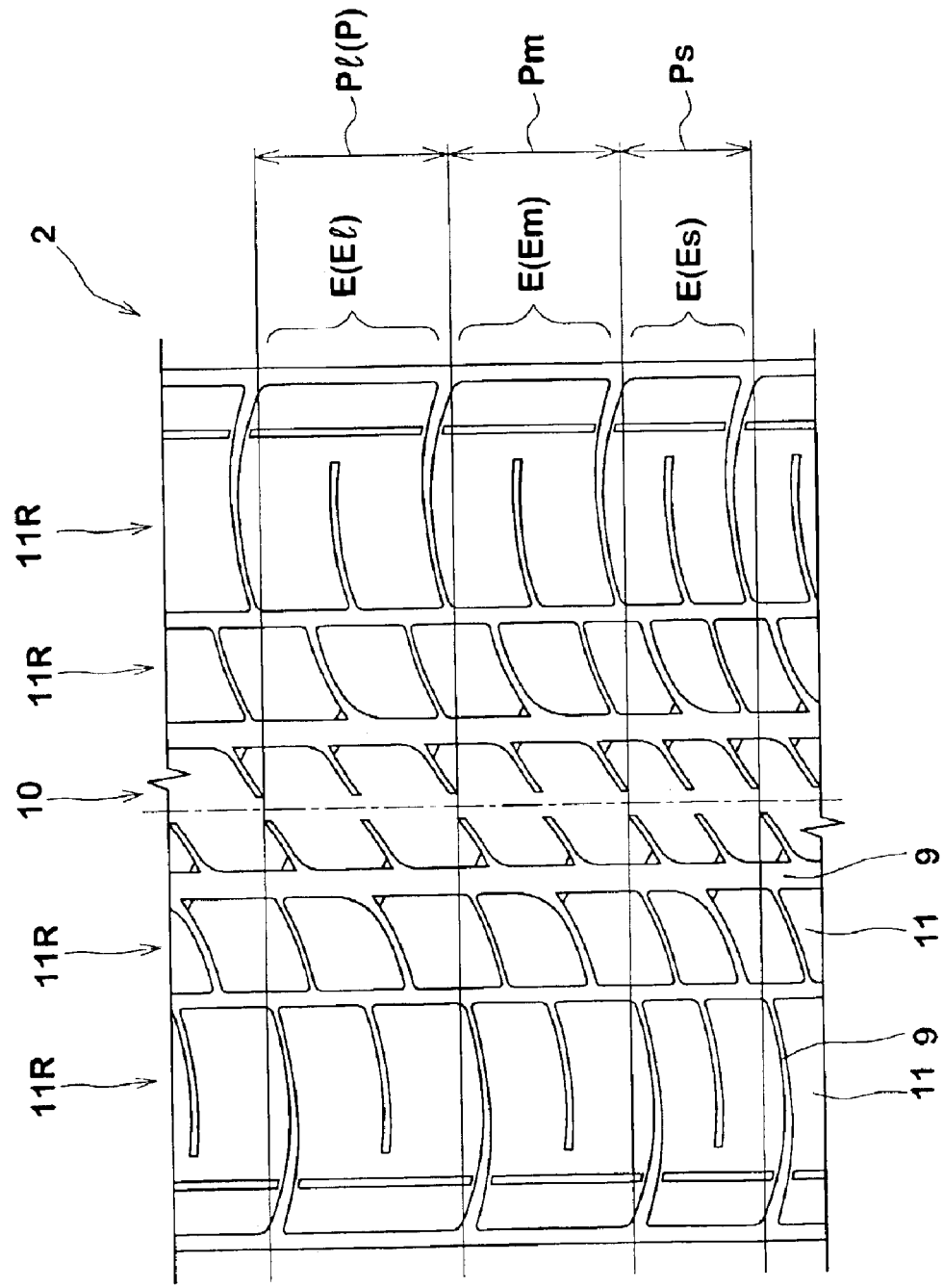
FIG. 2 is a partially developed plan view showing an example of the variable-pitch tread pattern of the pneumatic tire.

Pneumatic tires of size 225/60R16 for passenger cars having the tread pattern shown in FIG. 2 were made by using the mold according to the present invention schematically shown in FIGS. 4 and 5, and a conventional mold which was the same as the mold of the invention with the exception that there was not provided with the swelling region Y. And using an uniformity tester, the tractive force variation TFV and radial force variation RFV were measured at a low speed of 20 km/h and high speed of 120 km/h, and the third-order RFV and TFV which were obtained by analyzing the output date are shown in Table 1.

TABLE 1

| Tire | conventional | Embodiment |
| --- | --- | --- |
| Max. pitch Pl/Min. pitch Ps | — | 1.65 |
| Swelling H1 (mm) | 0 | 0.5 |
| Swelling region Y (XHT) | — | 0.4 to 0.8 |
| Uniformity | | |
| Low speed RFV (kgf/sq.cm) | 1.95 | 0.96 |
| Low speed TFV (kgf/sq.cm) | 0.37 | 0.17 |
| High speed RFV (kgf/sq.cm) | 3.86 | 1.9 |
| High speed TFV (kgf/sq.cm) | 10.37 | 4.32 |

Through the test, it was confirmed that it is possible improve not only TFV but also RFV.

What is claimed is:

1. A mold for a pneumatic tire, said pneumatic tire containing a pair of bead portions, a pair of sidewall portions and a tread portion provided with a tread pattern formed by repeating a pattern unit around the tire having plural kinds of pitches in a sequence, the mold comprising a sidewall molding surface for one of the sidewall portions, and a tread molding surface provided with a negative tread pattern formed by repeating a negative pattern unit for said plural kinds of pitches, in said sequence, to mold said tread pattern, said sidewall molding surface comprising sector regions defined as extending radially inwardly from the pattern units, respectively, wherein the largest sector regions defined as extending from the pattern units with the largest pitch swell towards a cavity of the mold when compared with the smallest sector regions defined as extending from the pattern units with the smallest pitch.

2. The mold according to claim 1, wherein the maximum swelling is in a range of from 0.1 to 1.0 mm in the axial direction.

3. The mold according to claim 1, wherein the swelling is in the range of from 0.6 times to 0.8 times the tire section height, which extends from the bead base line to the tread molding surface.

4. The mold according to claim 1, wherein said plural kinds of pitches include middle pitches between the smallest pitch and the largest pitch, and the middle sector regions, defined as extending from the pattern units with the middle pitches, swell towards the cavity of the mold when compared with the smallest sector regions, and the amount of the swelling is such that the larger the pitch, the larger the amount of swelling.

5. The mold according to claim 1, wherein said plural kinds of pitches include one middle pitch between the smallest pitch and the largest pitch, and the middle sector regions, defined as extending from the pattern units with the middle pitches, swell towards the cavity of the mold when compared with the smallest sector regions, and the amount of the swelling gradually changes from the smallest sector region to the largest sector region.

* * * * *